I. H. SISSON.
LUBRICATING DEVICE.
APPLICATION FILED MAR. 29, 1913.
1,091,866.  Patented Mar. 31, 1914.
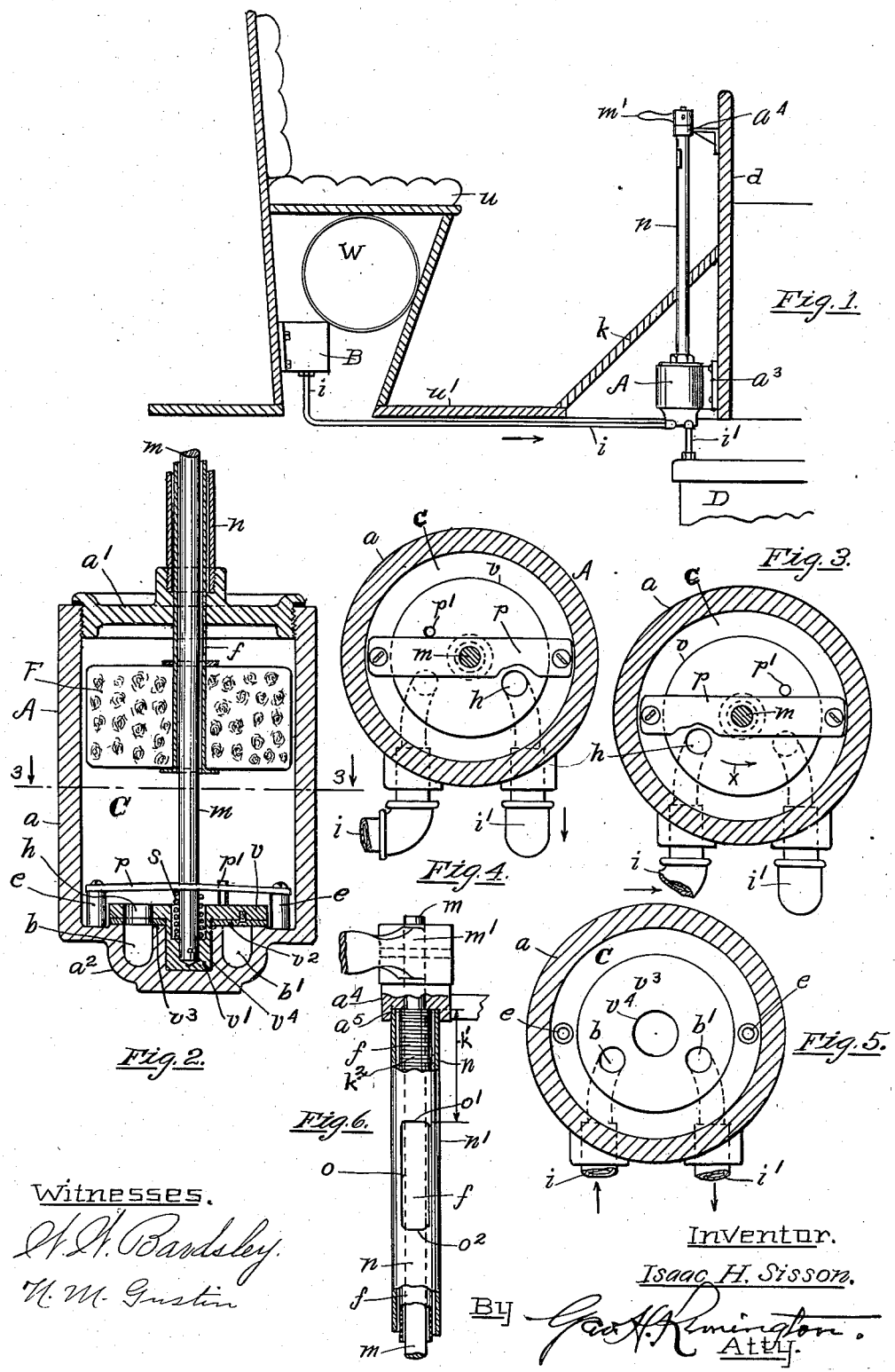
Witnesses.
W. H. Bardsley.
N. M. Gustin.
Inventor.
Isaac H. Sisson.
By Geo. H. Remington.
Atty.

UNITED STATES PATENT OFFICE.

ISAAC H. SISSON, OF PROVIDENCE, RHODE ISLAND.

LUBRICATING DEVICE.

1,091,866.
Specification of Letters Patent.
Patented Mar. 31, 1914.

Application filed March 29, 1913. Serial No. 757,495.

*To all whom it may concern:*

Be it known that I, ISAAC H. SISSON, a citizen of the United States, residing at Providence, in the county of Providence and State of Rhode Island, have invented certain new and useful Improvements in Lubricating Devices, of which the following is a specification.

My present invention relates to lubricating devices adapted more especially for use on motor-vehicles, and it consists in the novel construction and combination of its parts, all as more fully hereinafter set forth and claimed.

The primary object of the invention is to provide automobiles or other self-propelled vehicles with simple, inexpensive, reliable and conveniently accessible means, adapted, when manipulated by the chauffeur or driver of the car to cause a quantity of lubricating-oil to flow directly from a main reservoir or tank containing the oil into a small float-carrying chambered reservoir or container of known capacity located intermediate the said main reservoir and the motor-mechanism. Means connected with the float serves to visually indicate whether the small container's chamber is filled with the oil or is empty. The total cubical capacity of the chamber, minus the volume displaced by the float itself, equals the amount of oil constituting one charge, or pre-measured quantity.

It may be stated that it is found desirable to lubricate the engine and mechanism of the self-propelled vehicle with a predetermined charge or quantity of oil while it is traveling a certain number of miles, as for example, fifty. By means of my invention uniform charges of the oil may be fed to the motor as desired, first noting, however, in each instance, that the small container is filled with the oil before it is permitted to flow therefrom into the engine, &c. Obviously, the intake pipe connecting the main and small reservoirs is open while the latter is being charged, and closed when the oil is flowing directly from the charging chamber into the engine. In this connection, the following qualifying statement may be made: Obviously, too, in determining the amount of lubricating-oil fed to the engine, &c., per car-mile traveled, the condition, style, size, load, and type of self-propelled vehicle must be taken into consideration in determining the capacity and frequency of the charges. By means of the invention the driver can readily ascertain through the medium of the indicator or tell-tale whether the pipe connections, &c., communicating with the main supply of lubricating-oil, small container and the motor mechanism are normally working.

The charge-holding or small container is provided with a freely vertically movable float of known displacement. The container is also provided with intake and discharge connections communicating with the main supply tank and the motor mechanism, respectively. A manually controlled self-seating apertured valve having a stem extending upward through the small container to a convenient height and terminating in a handle member afford means through which the valve movements may be effected. The float member is or may be fixed to a light, tubular indicator member and inclosing the valve-stem; the upper portion of the tube being visible through a glass-covered protected opening formed in the wall of an outer stationary tube extending upward concentric to said indicator and valve-stem members.

In the accompanying sheet of drawings illustrating my improved lubricating device, Figure 1 represents a partial longitudinal sectional view of a portion of a motor-vehicle, showing the seat, dash, etc., and the relative arrangement of the lubricating mechanism thereto. Fig. 2 represents, in enlarged scale, a vertical sectional view, taken substantially through the center of the float-carrying sub-holder or small container, the intake passage being open to the chamber. Fig. 3 is a corresponding horizontal sectional view, taken on line 3—3 of Fig. 2. Fig. 4 is a similar sectional view, showing the valve in open communication with the discharge or outflow passage. Fig. 5 is a horizontal sectional view, the valve itself being omitted; and Fig. 6 is a front elevation, in partial section, showing the upper portion of the valve-stem, movable indicator tube or tell-tale and the stationary outer tube, the position of the parts corresponding with Fig. 2; the chamber assumed to be filled with the oil.

The following describes more in detail the construction of the device and manner of its operation:

In Fig. 1 $u^1$ designates portions of the floor of an automobile; $u$ its seat; $k$ the inclined foot-board, and $d$ the dash. W indicates the tank for containing the fluid-fuel supply, as gasolene; D a portion of the motor mechanism; and B the main reservoir containing lubricating-oil. In carrying out my invention proper I employ a minor reservoir or sub-container A, preferably disposed and concealed behind the foot-board $k$ and secured to the dash $d$ by a bracket $a^3$. The said member A is or may be cylindrical and provided with a chamber C of predetermined capacity, say one pint. Its outer side walls $a$ terminate in an integral base portion $a^2$ having independent passages $b, b^1$ extending through the faced valve-seat $v^3$ formed in the bottom of said chamber. An angularly movable valve $v$ is superimposed upon said seat, a packing element $v^2$ being fixed to the valve and bearing against the seat $v^3$ for obvious purposes. A single port or hole $h$ extends vertically through the valve and its packing and is arranged to register with the passages $b, b^1$. In order to centralize and support the valve, the latter may be provided with a hub $v^1$ fitting a recessed opening $v^4$ formed in the seat $v^3$. The valve is kept normally seated by means of a helical spring $s$ pressing against it and a stationary bar $p$; the latter secured to studs $e$. To the valve is fixed a valve-stem $m$ extending upwardly through the top $a^1$ of the container and surmounted by a valve-controlling handle $m^1$. Within the said chamber C is mounted a vertically movable float F of suitable material or substance; said float is secured to a central vertical tube $f$ or tell-tale, through which the valve-stem freely extends; the volume or displacement of the float being equal say to that of a half-pint of lubricating-oil, or other quantity, as desired. An outer float-protecting tube $n$ is fixed to the oil-tight cover $a^1$ and extends upwardly therefrom, its top end being supported in the counterbore $a^5$ of bracket $a^4$ secured to the dash. The said movable tube $f$ of the float extends upwardly within the outer tube $n$, its upper end being flush with that of tube $n$ when the chamber C is fully charged with lubricating-oil. Fig. 6 shows the corresponding position of the indicator when the chamber is thus filled. In order to limit the upward movement of the float, the end of the indicator-tube $f$ of the latter may engage the bottom of said counterbore, thereby automatically positioning the float itself a distance below the upper end of chamber C and correspondingly reducing the indicator's movement. It will be observed that in charging the chamber, the inflowing oil under sufficient head is adapted to pass under, around and over the float until the chamber is filled, the buoyancy of the float keeping the indicator in the said upper position until the release of oil from the chamber takes place.

The distance $k^1$, Fig. 6, from the upper end of the indicator $f$, when elevated to its limit of movement, down to the upper edge $o^1$ of an elongated visual opening $o$ formed in the wall of the stationary outer tube $n$ is or may be just equal to the length of the opening $o$, which also corresponds to the distance the float falls while the oil in chamber C is being discharged therefrom. The upper portion $k^2$ of the indicator may be painted some prominent, distinctive color different from that of the other part, thereby denoting that the chamber C is filled with oil when the part $k^2$ is concealed or invisible, said part moving downward with the float and registering with the visual opening $o$ when the chamber is empty. The length of part $k^2$ may equal the distance $k^1$.

In Fig. 3 the valve is shown positioned to receive oil from the reservoir B, via pipe $i$, port $b$, and valve opening $h$, direct into the charging chamber C; the pin $p^1$ of the valve then engaging the stationary bar $p$ and limiting the valve's movement in that direction. In order to empty the chamber the valve is rotated in the opposite direction (see arrow $x$ Fig. 3) until its opening $h$ registers with the port $b^1$, the stop-pin $p^1$ then engaging the opposite edge portion of the bar $p$—see Fig. 4; the outflowing charge of oil immediately passes from the chamber C, via the port $b^1$ and pipe $i^1$, into the motor, &c., as before stated. When the indicator shows that the chamber is empty, the float has fallen to its lowest position and rests on the fixed bar $p$; the operator may now recharge the chamber with oil by simply reversing the movement of the valve; the refilled chamber remains in this condition until the next succeeding release of the oil takes place, as determined by the judgment of the operator.

While the foregoing describes the construction and arrangement of the parts represented in the drawings, it is obvious that elements of the same general character may be employed without departing from the spirit and scope of the invention.

I claim:—

1. In a lubricating appliance for a motor-vehicle, a major tank or container for holding lubricating-oil, a suitably located minor container having a chamber of predetermined capacity, inlet and outlet connections for conducting oil from the major tank to the minor container and for leading it therefrom to an element to be lubricated, a manually controlled valve movably mounted in said chamber constructed to register with said inlet and outlet openings, a buoyant float-member having limited vertical movement inclosed in the chamber and disposed above said valve, and means for visually indicating, in connection with the float, the oil-filled and empty conditions of the chamber of the minor container.

2. The combination with a container member having a fluid-holding chamber of predetermined capacity arranged to be attached to a motor-vehicle provided with a tank for containing lubricating-oil, and having said container member provided with a valve-seat having independent inlet and outlet passages connected respectively to said tank and the element to be lubricated, of a manually operable valve supported on said seat having an opening or port therethrough adapted to register with said inlet and outlet passages, stops for limiting the movements of the seated valve, a float freely movable vertically in said container's chamber, an indicator member fixed to and movable with the float, means for limiting the vertical movements of the float and indicator members, and means connected with the latter for denoting whether the chamber is charged or empty.

3. In a device of the general character described, the combination with a fluid container having an inclosed chamber of predetermined capacity provided with inlet and outlet passages communicating therewith through spaced openings extending through a seat formed in the bottom of the chamber, said passages arranged to connect respectively with a main fluid supply and the element to be lubricated, of a self-seating manually actuated ported valve normally closing said openings, a stem fixed to the valve and extending upwardly through the top of the container, said valve adapted to be oscillated to cause its port to register with the seat openings, as desired, stops for limiting the angular movements of the valve, a float disposed in the container for displacing a predetermined volume of the fluid contents of the chamber, a vertically extending tube secured to the float and inclosing said valve-stem, a stop for limiting the upward movement of said tube, a supported stationary outer tube inclosing the movable tube having a suitably protected visual opening formed in its wall, and distinguishing means connected with said movable tube and disposed with relation to said opening of the stationary tube, for the purpose specified.

In testimony whereof I have affixed my signature in presence of two witnesses.

ISAAC H. SISSON.

Witnesses:
GEO. H. REMINGTON,
CHARLES C. REMINGTON.